United States Patent
El Mghazli et al.

(10) Patent No.: US 9,923,716 B2
(45) Date of Patent: Mar. 20, 2018

(54) SMART CARD PERSONNALIZATION WITH LOCAL GENERATION OF KEYS

(71) Applicant: Alcatel Lucent, Boulogne Billancourt (FR)

(72) Inventors: Yacine El Mghazli, Nozay (FR); Abdullatif Shikfa, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 73 days.

(21) Appl. No.: 14/417,572

(22) PCT Filed: Aug. 14, 2013

(86) PCT No.: PCT/EP2013/067007
§ 371 (c)(1),
(2) Date: Jan. 27, 2015

(87) PCT Pub. No.: WO2014/032977
PCT Pub. Date: Mar. 6, 2014

(65) Prior Publication Data
US 2015/0215121 A1    Jul. 30, 2015

(30) Foreign Application Priority Data

Sep. 3, 2012    (EP) .................................... 12306048

(51) Int. Cl.
*H04L 9/08*        (2006.01)
*H04W 12/04*    (2009.01)
*H04W 12/08*    (2009.01)

(52) U.S. Cl.
CPC ........... *H04L 9/0844* (2013.01); *H04W 12/04* (2013.01); *H04W 12/08* (2013.01); *H04L 2209/80* (2013.01)

(58) Field of Classification Search
CPC .................................................. H04L 9/0844
See application file for complete search history.

(56) References Cited

U.S. PATENT DOCUMENTS 7,023,994 B1    4/2006 Dupre
7,117,364 B1 * 10/2006 Hepper .............. G06Q 20/3552
                                                                 713/168
(Continued)

FOREIGN PATENT DOCUMENTS

CN         102036222       4/2011
EP          2182750         5/2010
(Continued)

OTHER PUBLICATIONS

3GPP Standard; 3rd Generation Partnership Project; Technical Specification Group Services and System Aspects; Feasibility Study on the Security Aspects of Remote Provisioning and Change of Subscription for Machine to Machine (M2M) Equipment (Release 9); 3GPP Standard; 3GPP TR 33.812; 3rd Generation Partnership Project; Mobile Competence Centre; 650, route des Lucioles; F-06921 Sophia-Antipolis Cedex; France; No. V9.20; Jun. 22, 2010; p. 1-87; XP050441986.

(Continued)

*Primary Examiner* — Oleg Korsak
*Assistant Examiner* — Simon Kanaan
(74) *Attorney, Agent, or Firm* — Patti & Malvone Law Group, LLC

(57) ABSTRACT

For personalizing a smart card (SC) coupled with a communication device (CD) of a user being a subscriber of a first telecommunication network (TN1) and wishing to become a subscriber of a second telecommunication network (TN2), a first international identity (IMSI_1) and a first authentication key (AK_1) being stored in the smart card (SC), the smart card receives a message (MesP) from an application server (AS) connected to the first telecommunication network and the second telecommunication network, the message (MesN) comprising a personalization command (ComP) and an admin code (ACas), after that the application server has (Continued)

received a request (Req) of subscription change comprising an identifier (1dMNO2) of the second telecommunication network (TN2) and has established a secured session with a personalization server (PS) of the second telecommunication network (TN2) identified by the identifier (1dMNO2), and interprets the personalization command (ComP) to establish a secure session with the personalization server (PS) via the application server (AS), if the admin code (ACas) is valid. The smart card negotiates with the personalization server to agree on an second authentication key, by exchanging messages containing values derived from random secrets, receives a message (Mes3) containing an second international identity (IMSI_2) from the personalization server (PS), and replaces the first international identity (IMSI_1) and the first authentication key (AK_1) by the second international identity and the second authentication key.

17 Claims, 2 Drawing Sheets

(56) References Cited

U.S. PATENT DOCUMENTS

| | | | | |
|---|---|---|---|---|
| 8,275,357 | B1* | 9/2012 | Barkley | H04L 63/0428 455/411 |
| 2005/0063544 | A1* | 3/2005 | Uusitalo | H04L 63/06 380/277 |
| 2010/0106967 | A1* | 4/2010 | Johansson | H04L 9/12 713/158 |
| 2011/0038480 | A1* | 2/2011 | Lin | H04W 12/04 380/270 |
| 2012/0159167 | A1* | 6/2012 | Lee | H04L 9/321 713/168 |
| 2014/0089669 | A1* | 3/2014 | Papillon | H04W 4/003 713/171 |
| 2015/0181024 | A1* | 6/2015 | El Mghazli | H04W 12/04 455/411 |

FOREIGN PATENT DOCUMENTS

| | | |
|---|---|---|
| EP | 2448298 | 5/2012 |
| WO | 2010132499 | 11/2010 |

OTHER PUBLICATIONS

Alcatel Lucent; TR 33.812 Network Architecture; 3GPP Draft; S3-100435 TR 33 812 Network Architecture; 3rd Generation Partnership Project (3GPP); Mobile Competence Centre; 650, route des Lucioles; F-06921 Sophia-Antipolis Cedex; France; vol. SA WG3, No. Lisbon, Portugal; Apr. 26, 2010-Apr. 30, 2010; Apr. 18, 2010; XP050636189.

* cited by examiner

SMART CARD PERSONNALIZATION WITH LOCAL GENERATION OF KEYS

FIELD OF THE INVENTION

The present invention relates to a personalization of a smart card via a telecommunication network with local generation of authentication keys.

BACKGROUND

Mobile communications provides access by mobile phones, Personal Digital Assistant PDAs, portable computers and a variety of other user equipment to communicate via radio access networks (RANs) to core networks for connection to other mobile devices, the Internet, and conventional land-line phones. The RANs are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station. Communications between the core network and the base station is encrypted and communications between the base station and the wireless user equipment is also encrypted.

Mobile Networks are using a strong authentication method based on a shared secret configured on the network side in the Authentication Center of the HLR or the HSS, and on the terminal side in the Universal Integrated Circuit Card (UICC) containing a SIM (Subscriber Identity Module) application for a GSM network or a USIM (Universal Subscriber Identity Module) in a UMTS network.

This shared secret is an authentication key and the action to configure a generic UICC card with a given authentication key is called personalization.

The authentication key is a 128 bit key used in the authentication and cipher key generation process. The authentication key is used to authenticate the UICC card on the mobile network. Each UICC contains this authentication key which is assigned to it by the operator during the personalization process.

So Mobile Network Operators (MNOs) are physically personalizing the UICC cards in their premises and once for all. Operators then send the personalized UICC card to the user, who will insert it in his mobile terminal to access the mobile network of the MNO. The personalization can also be outsourced to the UICC provider, but it is always configured physically and for ever.

When a user wants to change its MNO, the new MNO sends a new personalized UICC card and the user has to insert this new card into its mobile terminal to access the new network. This implies a problem for devices that should be sold with the UICC inside them (for e.g. security reasons), or devices that are difficult (or too costly) to access, like sensors, cars/trucks, vending machines. For these devices, the manual replacement of the UICC card is too costly or even impossible.

There is need to allow easy reconfiguration of the UICC of the mobile terminal with a different set of credentials, in order to change the serving mobile network operator, while preserving confidentiality of authentication key.

SUMMARY

To remedy the problems referred to hereinabove, a method for personalizing a smart card coupled with a communication device of a user being a subscriber of a first telecommunication network and wishing to become a subscriber of a second telecommunication network, a first international identity and a first authentication key being stored in the smart card, comprises the following steps in an application server connected to the first telecommunication network and the second telecommunication network, comprises the following steps in the smart card:

receiving a message from an application server connected to the first telecommunication network and the second telecommunication network, the message comprising a personalization command and an admin code, after that the application server has received a request of subscription change comprising an identifier of the second telecommunication network and has established a secured session with a personalization server of the second telecommunication network identified by the identifier, interpreting the personalization command to establish a secure session with the personalization server via the application server, if the admin code is valid, negotiating with the personalization server to agree on an second authentication key, by exchanging messages containing values derived from random secrets, receiving a message containing a second international identity from the personalization server, replacing the first international identity and the first authentication key by the second international identity and the second authentication key.

The invention advantageously allows a remote reconfiguration of credentials associated with a telecommunication network operator and allows ability to easily change of the subscription of telecommunication network operator in a very flexible way, in a non-limited number of times.

The invention advantageously enables new roaming offers which will benefit to the subscriber, since it will leverage on a local subscription without having to change its smart cards and allows embedment of smart cards into communication devices.

The invention allows the remote configuration of smart cards without the transmission of the new authentication keys over the air, which means that the risk of authentication keys interception or leakage is reduced.

In an embodiment, the negotiation between the smart card and personalization server includes the following steps in the smart card:

sending a first message containing a first value derived from a first random secret to the personalization server, receiving a second message containing a second value derived from a second random secret from the personalization server, and computing a second authentication key as a function of a third value derived from the second value and the first random secret.

In an embodiment, the request of subscription change is sent by the communication device or by an entity of the second telecommunication network after user agreement.

In an embodiment, the request comprises an identifier of the smart card, and the application server retrieves the admin code that was initially stored in a database in correspondence with an identifier of the smart card corresponding to identifier of the smart card comprised in the received request, before sending the message.

In an embodiment, an application in the smart card checks if the admin code received in the message is compatible with the admin code initially stored in the smart card in order to determine if the admin code is valid.

In an embodiment, the application server informs the operator of the first telecommunication network that the user is not a subscriber of this latter anymore, in order that the operator of the first telecommunication network deletes the first international identity and the first authentication key in the home location register of the first telecommunication network.

In an embodiment, the messages are encrypted short messages and may be decomposed in many messages.

In an embodiment, the messages contain data packets sent to the smart card through a service node and a gateway node of the second telecommunication network via a secured session.

In an embodiment, the application server interrogates an entity of the first telecommunication network in order to obtain an acknowledgement for subscription change, before sending the message to the communication device.

A further object of the invention is a smart card coupled with a communication device of a user being a subscriber of a first telecommunication network and wishing to become a subscriber of a second telecommunication network, a first international identity and a first authentication key being stored in the smart card, the smart card comprising:

means for receiving a message from an application server connected to the first telecommunication network and the second telecommunication network, the message comprising a personalization command and an admin code, after that the application server) has received a request of subscription change comprising an identifier of the second telecommunication network and has established a secured session with a personalization server of the second telecommunication network identified by the identifier, means for interpreting the personalization command to establish a secure session with a personalization server via the application server, if the admin code is valid, means for negotiating with the personalization server to agree on an initial authentication key, by exchanging messages containing values derived from random secrets, means for receiving a message containing an second international identity from the personalization server, means for replacing the first international identity and the first authentication key by the second international identity and the second authentication key.

A further object of the invention is an application server for personalizing a smart card coupled with a communication device of a user being a subscriber of a first telecommunication network and wishing to become a subscriber of a second telecommunication network, a first international identity and a first authentication key being stored in the smart card, the application server being connected to the first telecommunication network and the second telecommunication network and comprising:

means for receiving a request of subscription change comprising an identifier of the second telecommunication network, means for establishing a secured session with a personalization server of the second telecommunication network identified by the identifier, and means for sending a message comprising a personalization command and an admin code in order that the smart card, interprets the personalization command to establish a secure session with a personalization server via the application server, if the admin code is valid, negotiates with the personalization server to agree on an initial authentication key, by exchanging messages containing values derived from random secrets, receives a message containing an second international identity from the personalization server, and replaces the first international identity and the first authentication key by the second international identity and the second authentication key.

A further object of the invention is a personalization server for personalizing a smart card coupled with a communication device of a user being a subscriber of a first telecommunication network and wishing to become a subscriber of a second telecommunication network, a first international identity and a first authentication key being stored in the smart card, the personalization server being connected to the second telecommunication network and comprising:

means for establishing a secure session with the smart card via an application server connected to the first and second telecommunication networks, if an admin code received in a message sent from the application server to the smart card is valid, after that the application server has received a request of subscription change comprising an identifier of the second telecommunication network and has established a secured session with the personalization server identified by the identifier, and after that the smart card has interpreted a personalization command included in said message to establish the secure session with the personalization server, means for negotiating with the smart card to agree on an second authentication key, by exchanging messages containing values derived from random secrets, means for sending a message containing a second international identity to the smart card that is able to replace the first international identity and the first authentication key by the second international identity and the second authentication key.

The invention relates further to computer programs adapted to be executed in servers for performing an personalization of a smart card coupled with a communication device, said programs including instructions which, when the program is executed in said servers, execute the steps of the method of the invention performed in the servers.

BRIEF DESCRIPTION OF THE FIGURES

Some embodiments of the present invention are now described, by way of example only, and with reference to the accompanying drawings, in which.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
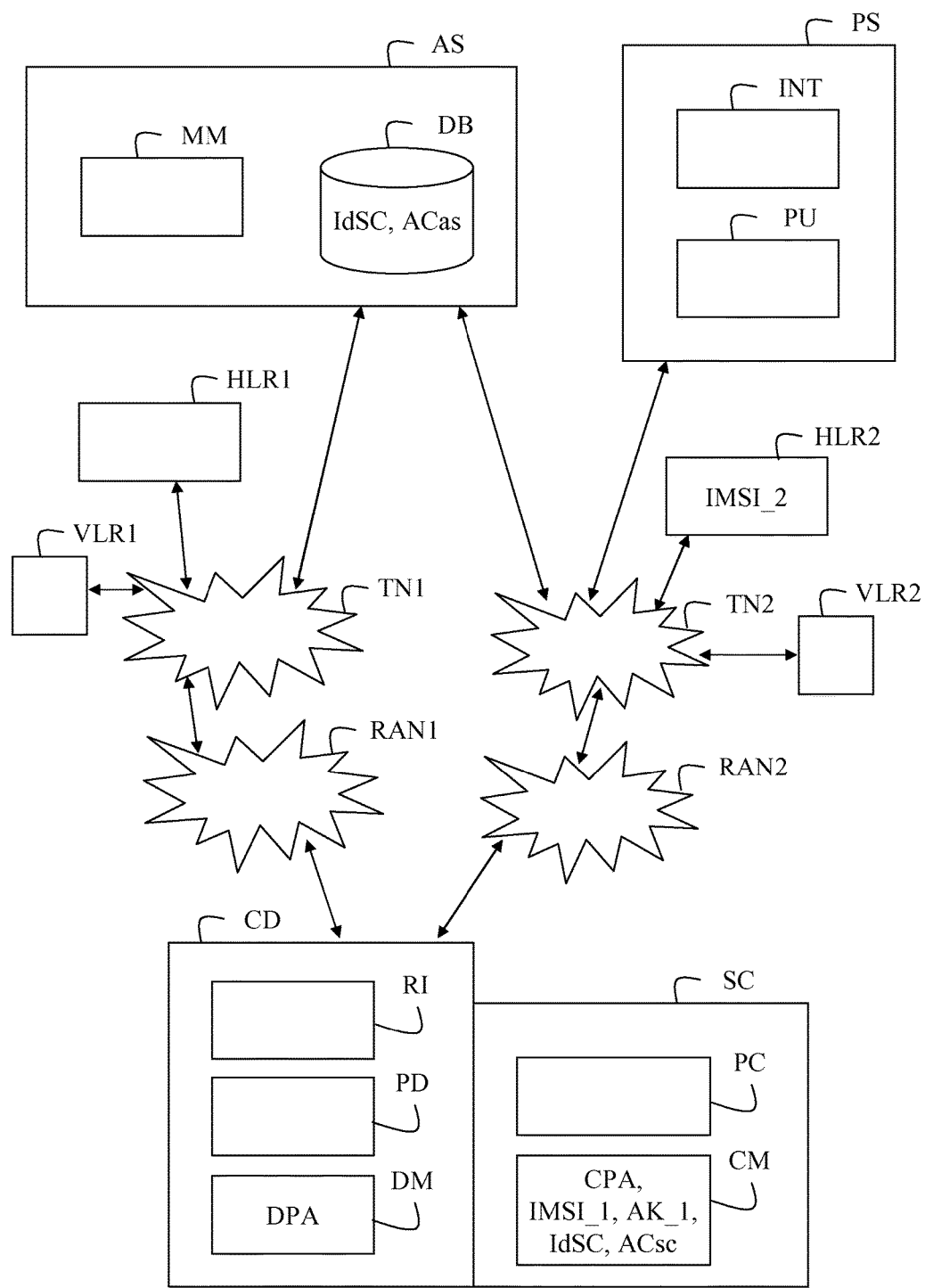
FIG. 1 is a schematic block-diagram of a communication system according to an embodiment of the invention.

Referring to FIG. 1, a communication system comprises an application server AS and a communication device CD which are able to communicate between them through a first telecommunication network TN1 and a second telecommunication network TN2, and a personalization server PS included in the second telecommunication network TN2.

For example, the telecommunication network TN1, TN2 is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio. For example, the telecommunication network is able to authorize a communication device to send and receive data via the network when the communication device is identified at the network, for example by means of a subscriber identification module associated with the communication device.

FIG. 1 does not represent known main components of the localization area of the telecommunication network where the communication device is situated. For example in a GSM type network, the localization area comprises an MSC (Mobile service Switching Center) which is connected by means of a BSC (Base Station Controller) to a base station BTS (Base Transceiver Station) connected by means of a radio link to the communication device.

The communication device CD can establish a connection with the telecommunication network TN1, TN2 through a respective radio access network RAN1, RAN2 via a radio link with the base station. The radio access networks are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station.

Each telecommunication network TN1, TN2 comprises a respective Home Location Register HLR1, HLR2 and one or more Visitor Location Register VLR1, VLR2. Each register HLR1, HLR2 collaborates with an authentication center that manages a respective database containing, in particular, a set of international identities IMSI (International Mobile Subscriber Identity) and a set of authentication keys called AK each associated with a subscription profile for each user of the network and the number of the register VLR1, VLR2 to which the communication device is temporarily connected.

The radio access network of each telecommunication network is connected to a set of service nodes SGSN and gateway-nodes GGSN (Gateway GPRS Support Node) supporting a packet-switched core network of the telecommunication network and is connected to a switch MSC supporting a circuit-switched core network of the telecommunication network. All of the SGSN and GGSN nodes constitute a gateway connecting the radio access network and the packet core network. According to the invention, the application server AS may be directly or indirectly accessible from the gateway node GGSN of the corresponding telecommunication network via a packet communication network, for example the Internet, and also from the switch MSC via a Short Message Service Center SMSC.

In order to not encumber the FIG. 1, the mentioned service node SGSN, gateway-node GGSN and Short Message Service Center SMSC of each telecommunication network are not represented.

The communication device CD can be a radio communication mobile terminal. For example, the communication device CD is a mobile phone, or is a communicating Personal Digital Assistant PDA, or an intelligent telephone like SmartPhone.

In an example, the communication device CD is a cellular mobile radio communication terminal, connected by a channel to a radio access network of the telecommunication network TN, e.g. GSM (Global System for Mobile communications) or UMTS (Universal Mobile Telecommunications System) or LTE (Long Term Evolution).

By way of example, the communication device CD may be a motor vehicle belonging to a taxi company, or an automatic counter of a particular energy, such as water, gas, or electricity belonging to a company in the energy sector, or a beverage vending machine belonging to a company specializing in food vending. The communication device CD is therefore a fixed or mobile device that contains a UICC card and can communicate with the telecommunication network by means of the UICC card.

In other examples, the communication device CD can be replaced by any device which is equipped with a smart card reader and can communicate with the smart card.

In one embodiment, it is considered that the communication device CD is owned by a user who is a subscriber of the first telecommunication network TN1 and who wishes to become a subscriber of the second telecommunication network TN2, cancelling thus its subscription to the first telecommunication network.

In all cases, it is considered that the communication device and the smart card are owned by a user. For example, the user can be a physical person or an individual in case the communication device is a mobile terminal or a SmartPhone, and the user can be a moral person or a legal entity in case the communication device is a machine like a motor vehicle or an automatic counter.

The communication device CD is associated with a smart card SC, for example included in the communication device CD.

The communication device CD comprises a radio interface RI, a processor PD, device memories MD and a smart card reader. The memories MD comprise various memories such as ROM memory, nonvolatile memory EEPROM or Flash, and RAM memory.

The radio interface RI transposes in frequency, converts digitally, demodulates and decodes messages received via the telecommunication network TN, and inversely transmits messages.

The device memories MD comprise the operating system of the communication device CD and an execution environment such as a Java virtual machine JVMT programmed in Java, for example J2ME.

In particular, in the nonvolatile memory of device memories MD are implemented device applications, originally written in a high level language of type object-oriented such as language Java compatible with virtual machine JVMT. The virtual machine JVMT can communicate with a virtual machine JVMC installed in the smart card SC via a predetermined communication protocol, like protocol APDU.

In order that device applications respectively communicate with card applications implemented in the smart card SC in accordance with predetermined communication protocol, an access interface to access resources and data in the smart card is implemented in the device memories DM for example under the form of a Java API (Application Programming Interface).

Device memories DM further include a communication interface, for example the SIM Toolkit engine, so that a main application SIM or USIM or any other application in the smart card communicates with the "outside world" via the communication device, for example with an application server. The communication interface manages commands and responses exchanged between the "outside world" and the main application SIM or USIM, for example by adapting them to short messages exchanged with a short message server.

The smart card SC, also known as microcontroller card or integrated circuit card, is a user identity module of UICC type associated with the communication device.

In one embodiment, a microcontroller in the smart card SC mainly comprises one or more processors PC, and card memories CM. The smart card exchange commands, or requests, and replies with the communication device CD via an input/output port of the smart card reader of the communication device CD with or without contact. The various components of the smart card may be interconnected by a bidirectional bus.

Card memories CM comprise memory of type Flash or ROM including codes and data for example of an operating system and a virtual machine JVMC compliant with the Java Card specification, or any other operating system.

Card memories CM comprise also memory of type Flash or EEPROM for storing for example identity numbers and other parameters of the profile of the user possessing the card, such as a PIN code, an international identity, an authentication key, an identifier IdSC of the smart card, an admin code ACsc, and other security data. It is considered that the communication device CD is owned by a user who is a subscriber of the first telecommunication network TN1, so card memories CM contains an admin code ACsc for accessing or modifying the smart card, and contains also an international identity IMSI_1 and an authentication key AK_1, used to authenticate the user by the first telecommunication network TN1.

Card memories CM comprise also memory of type RAM serving more particularly to data processing.

Card memories CM comprise also a memory space to store card applications which are proprietary code or applets STK, e.g. SIM ToolKit, and that are installed during the manufacture of the smart card or possibly installed during use of the card at the request of the user or the operator.

In particular, a card personalization application CPA is stored in the card memories CM and has a read/write access especially to the international identity, the authentication key, and the identifier, for example under an OTA command presenting the admin code ACsc. The card personalization application CPA is able to handle commands and messages according to an over-the-air (OTA) mechanism and is able to communicate with a corresponding device personalization application DPA stored in the device memories DM of the communication device CD for some functionalities such as an interface with the user, and is also able to communicate with the application server AS for the personalization of the smart card.

The application server AS is a server included in a network connected to the first and the second telecommunication networks TN1 and TN2, but is not managed by any operator of these telecommunication networks, acting as an independent service entity. In one variant, the application server AS is managed by one of the first and the second telecommunication networks TN1 and TN2.

The application server AS is a platform that is accessible from the communication device CD through either the first and the second telecommunication networks TN1 and TN2. The application server AS is able to communicate with the register HLR1 and HLR2 directly or through the first and the second telecommunication networks TN1 and TN2 respectively, via a secured session for example of IPsec (Internet Protocol Security) type.

The application server AS comprises a messaging module MM handling exchange of messages with the communication device CD or the smart card SC and with the personalization server PS, for example in the form of short message through a short message center, and handling exchange of messages with entities of the first and the second telecommunication networks TN1 and TN2. The messaging module MM establishes a secure channel between the smart card SC and the personalization server PS.

The application server AS manages a database DB wherein admin codes ACas are stored in correspondence with identifiers IdSC of smart cards. An admin code corresponds to a secret shared between the application server AS and a smart card SC, and is unique for each smart card SC. It is considered that an admin code allows a command provided through an OTA mechanism to obtain read/write access to the space memory of the smart card SC where the international identity IMSI and the authentication key AK are stored.

The personalization server PS is a server included in the second telecommunication network TN2 and managed by the operator of the second telecommunication network TN2.

The personalization server PS comprises an interface INT handling exchange of messages with the smart card SD via the application server AS. The interface INT can communicate with a register of the telecommunication network TN in order to obtain international identity from it.

The personalization server PS comprises a processing unit PU dedicated to the computing of authentication keys.

Figure 2:
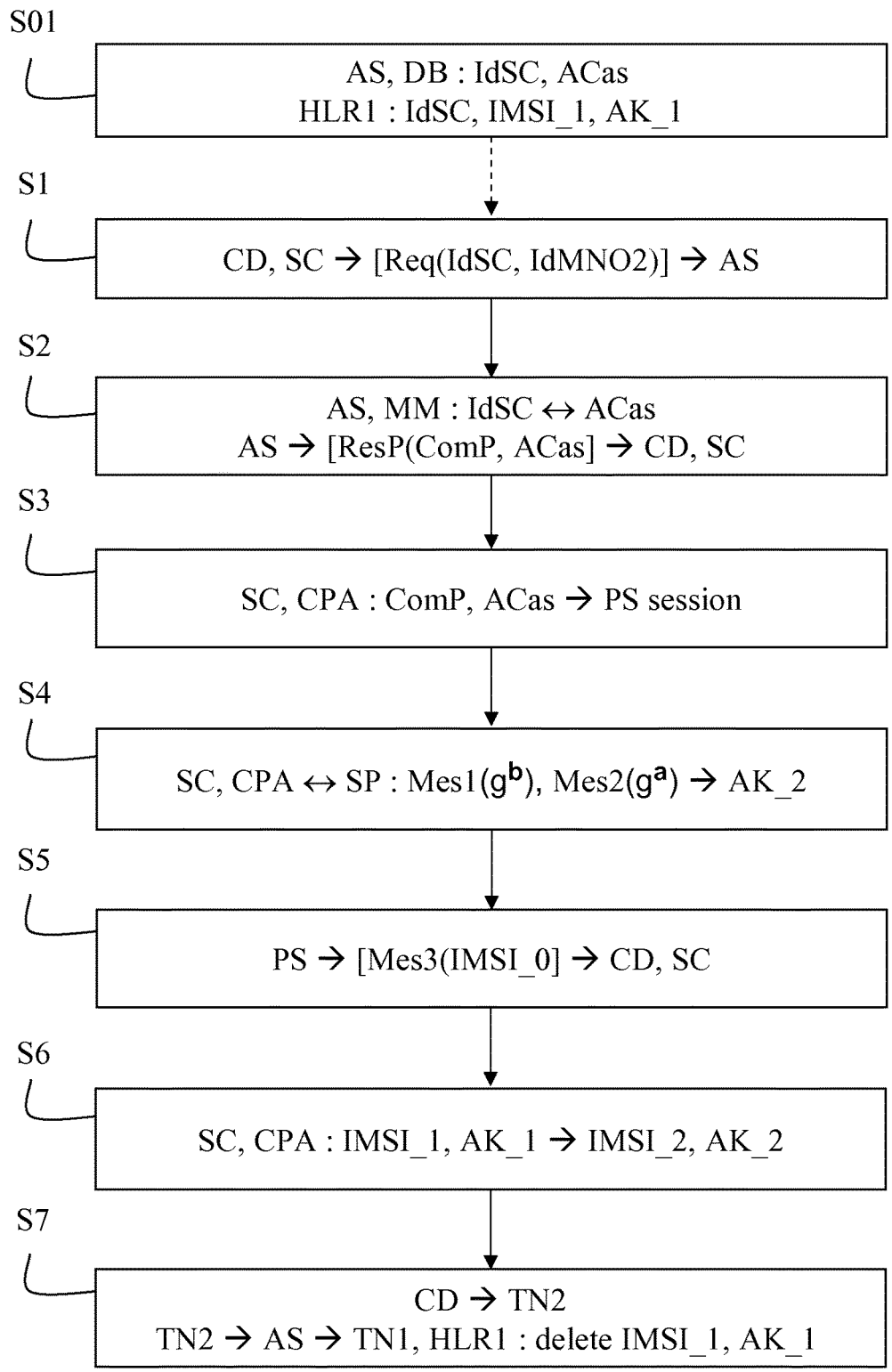
FIG. 2 is a flowchart showing steps performed to execute a method for personalizing a smart card coupled with a communication device in a telecommunication network with local generation of authentication keys according to an embodiment of the invention.

With reference to FIG. 2, a method for personalizing a smart card coupled with a communication device with local generation of authentication keys according to one embodiment of the invention comprises steps S1 to S7 executed automatically within the communication system.

The method is described hereinafter with reference to the first and the second telecommunication networks TN1 and TN2 for a user who is a subscriber of the first telecommunication network TN1 and who wishes to become a subscriber of the second telecommunication network TN2, but can be extended to more telecommunication networks.

At an initial step S01, the application server AS communicates with each operator of the first and the second telecommunication networks TN1 and TN2, in order to make agreement for potential subscription change of users and to set an encryption key for session dedicated for such subscription change.

The application server AS also stores in the database DB the admin codes ACas respectively associated with smart cards SC of users who are subscribers of the first and the second telecommunication networks TN1 and TN2. The admin codes ACas may be obtained from the smart card manufacturer, before the smart cards are provided to the operators. For example, the admin code ACas is stored in correspondence with an identifier IdSC of the smart card.

Once a smart card is provided to the operator and attributed to a user who becomes a subscriber of the operator, the operator personalizes the smart card by creating an international identity and an authentication key. The personalization of the smart card could be also outsourced to the smart card manufacturer. The created international identity and authentication key are stored in the register HLR in correspondence with the identifier of the smart card.

In the example embodiment, a user becomes a subscriber of the first telecommunication network TN1. The database of register HLR1 contains the identifier IdSC of the smart card stored in correspondence with an international identity IMSI_1 and with an authentication key AK_1. Also, the international identity IMSI_1 and the authentication key AK_1 are stored in the card memories CM of the smart card SC.

At step S1, the user solicits a request in order to change its operator subscription for the operator of the second telecommunication network TN2. For example, the user selects a command in a menu displayed in the communication device by a device personalization application DPA or enters a code of command read from a document of the operator.

The communication device CD sends a request Req comprising the identifier IdSC of the smart card and an identifier IdMNO2 of the second telecommunication network TN2 to the application server AS.

In one embodiment, the request Req is in the form of a short message which is handled by a short message center that transforms the message into data packets and sends the data packets through first the telecommunication network TN1 to the application server AS.

In a variant embodiment, the user does not transmit the request to the application server but the user contacts a customer center of the operator of the second telecommunication network TN2, for example via a contact center or a web site, and provides the identifier IdSC of the smart card to the operator. After user agreement, an entity of the operator sends a similar request Req to the application server AS, the request comprising also the identifier IdSC of the smart card and an identifier IdMNO2 of the second telecommunication network TN2.

The messaging module MM of the application server AS receives the request and interprets it as a request of subscription change in favor of the operator of the second telecommunication network TN2 thanks to the received identifier IdMNO2. In particular, the application server AS checks if the identifier IdSC is stored in the database DB, which means that the application server AS can perform the smart card personalization.

At step S2, the messaging module MM of the application server AS establishes a secured session, for example of IPsec type, with the second telecommunication network TN2, in particular with the personalization server PS, identified by the identifier IdMNO2.

The messaging module MM of the application server AS retrieves the identifier IdSC of the smart card stored in the database DB corresponding to identifier IdSC of the smart comprised in the request Req. The application server AS retrieves then the admin code ACas stored in correspondence with the identifier IdSC of the smart card in the database.

The messaging module MM of the application server AS sends a personalization message MesP comprising a personalization command ComP, the admin code ACas, and optionally an identifier of the personalization server PS to the communication device CD, in order that the smart card and the selected operator can agree on a new authentication key which is computed locally at each side. The personalization message MesP is sent from the application server AS across the first networks TN1 and RAN1 to the smart card SC via the communication interface of the communication device CD.

For example, the personalization message MesP is transformed by a short message center of the first telecommunication network TN1 into a short message that is encrypted. The received personalization message MesP is decrypted by the smart card and the content of the message is temporarily stored in the card memories CM of the smart card to be executed by the card personalization application CPA.

At step S3, the card personalization application CPA interprets the personalization command ComP to execute the personalization of the smart card SC. The card personalization application CPA checks if the admin code ACas is valid, that is to say if the admin code ACas received in the personalization message MesP is compatible with the admin code ACsc initially stored in the smart card. In one example, the admin code ACas received in the personalization message MesP has to be the same as the admin code ACsc initially stored in the smart card. More generally, the admin codes may be tools used for authentication and ciphering procedures in case the personalization message MesP is decomposed in many messages.

If the admin code ACas is valid, the card personalization application CPA launches series of messages exchange with the identified personalization server PS via the application server AS in order to determine on each side authentication keys. The messages exchange can be based on a Diffie-Hellman protocol as described hereinafter.

At step S4, the smart card SC negotiates with the personalization server PS to agree on a second authentication key, by exchanging messages containing values derived from random secrets, the second authentication key being computed locally in the smart card and in the personalization server based on a function taking as input at least the random secrets.

The smart card SC and the personalization server PS exchanges series of messages, and some of them can be sent simultaneously.

The smart card SC and the personalization server PS negotiate to agree on a group G and a generator g of the group G.

The group G can be a multiplicative group of integers modulo p, where p can be prime and g is a primitive root mod p.

Optionally, this agreement can be performed publicly.

Optionally, this agreement can be pre-established or decided by the application server AS.

The smart card SC determines a random secret "a" and the personalisation server PS determines a random secret "b", where a and b are integers.

The smart card SC computes $(g^a)(\mod p)$ and the personalisation server PS computes $(g^b)(\mod p)$.

The smart card SC sends a first message Mes1 containing the value A of $(g^a)(\mod p)$ to the personalisation server PS through the secured channel via the application server AS.

The personalisation server PS sends a second message Mes2 containing the value B of $(g^b)(\mod p)$ to the smart card SC through the secured channel via the application server AS.

Then the smart card SC knows "a" and "B" and the personalization server PS knows "b" and "A" and both can compute a shared secret S based on the value of $(g^{ab} [\mod p])$.

The smart card SC and the personalization server PS have arrived at the same value, because $(g^a)^b$ and $(g^b)^a$ are equal mod p and groups are power associative.

The smart card SC and the personalization server PS compute a same second authentication key AK_2 as a function of the shared secret S, the function being known beforehand from smart card SC and the personalization server PS.

The process described above corresponds to a specific embodiment, but second authentication key can be computed with similar process, for instance where the group G is a cyclic group, a and b are natural number and the smart card and the personalization server compute $(g^a)^b$ and $(g^b)^a$ that are equal because the group G is power associative.

At step S5, once the second authentication key is computed, the interface INT of the personalisation server PS obtains a second international identity IMSI_2 from a register of the second telecommunication network TN2.

The personalisation server PS sends a third message Mes3 containing the second international identity IMSI_2 to the smart card SC.

In one embodiment for steps S4 and S5, the messages are transformed by a short message center SMSC of the telecommunication network TN into a short message that is encrypted. The messages are decrypted by the smart card and the content of the message is temporarily stored in the card memories CM of the smart card to be executed by the card personalization application CPA.

In another embodiment for steps S4 and S5, the messages contain data packets and are transmitted through the SGSN and GGSN nodes via a secured session for example of IPsec (Internet Protocol Security) type.

It will be understood that the messages can be decomposed in several messages, especially in the case where the messages are in form of short messages.

At step S6, the card personalization application CPA deletes the identity IMSI_1 and the authentication key AK_1 initially stored in the card memories CM of the smart card SC, and replace them by the international identity IMSI_2 and authentication key AK_2.

Optionally, the card personalization application CPA can activate the device personalization application DPA in order to ask an acknowledgement of the user for the card personalization. For example, the device personalization application DPA displays a question like the following: "Are you sure to change MNO and to become subscriber of MNO2?".

At step S7, the communication device CD can launch a connection request to be attached to the second telecommunication network TN2, for example by sending a "IMSI-attach" signalling message.

The operator of the second telecommunication network TN2 is aware of the success of the personalization of the smart card, for example after a successful authentication of the communication device CD by the second telecommunication network TN2, and informs the application server AS. The application server AS then informs the operator of the first telecommunication network TN1 that the user is not a subscriber of this latter anymore. The operator of the first telecommunication network TN1 can delete the international identity IMSI_1 and the authentication key AK_1 in the database of the register HLR1.

Optionally, the application server AS informs the operator of the first telecommunication network TN1 that the user will not be a subscriber of this latter anymore, at step S2 before sending the personalization message MesP to the communication device CD. For example, the application server AS interrogates an entity of the first telecommunication network TN1 in order to obtain an acknowledgement for subscription change.

The invention described here relates to a method and a server for a personalization of a smart card coupled with a communication device. In an embodiment, the steps of the method of the invention are determined by the instructions of a computer program incorporated in a server such as the application server AS or the personalization server PS according to the invention. The program includes program instructions which, when said program is executed in a processor of the server the operation whereof is then controlled by the execution of the program, execute the steps of the method according to the invention.

As a consequence, the invention applies also to a computer program, in particular a computer program on or in an information medium readable by a data processing device, adapted to implement the invention. That program may use any programming language and be in the form of source code, object code or an intermediate code between source code and object code, such as a partially compiled form, or in any other desirable form for implementing the method according to the invention.

The information medium may be any entity or device capable of storing the program. For example, the medium may include storage means or a recording medium on which the computer program according to the invention is recorded, such as a ROM, for example a CD ROM or a microelectronic circuit ROM, or a USB key, or magnetic recording means, for example a diskette (floppy disk) or a hard disk.

The invention claimed is:

1. A method for personalizing a smart card coupled with a communication device of a user being a subscriber of a first telecommunication network, a first international identity and a first authentication key being stored in the smart card, the method comprising:
    receiving, at the smart card, a first message from an application server connected to the first telecommunication network and a second telecommunication network, the first message comprising a personalization command and an admin code, the admin code being a unique code for accessing or modifying the smart card;
    interpreting, at the smart card, the personalization command to establish a secure session with a personalization server of the second telecommunication network via the application server if the admin code is valid;
    negotiating, at the smart card, with the personalization server to agree on a second authentication key by exchanging messages based on a Diffie-Hellman protocol, wherein the messages contain values derived from random secrets, the second authentication key being computed in the smart card and in the personalization server based on a function that takes as input at least the random secrets;
    receiving, at the smart card, a second message that contains a second international identity from the personalization server; and
    replacing, at the smart card, the first international identity and the first authentication key with the second international identity and the second authentication key.

2. The method according to claim 1, wherein the negotiation between the smart card and the personalization server comprises:
    sending, at the smart card, a third message that contains a first value derived from a first random secret to the personalization server; and receiving, at the smart card, a fourth message that contains a second value derived from a second random secret from the personalization server, and computing the second authentication key as a function of a third value derived from the second value and the first random secret.

3. The method according to claim 1, wherein a request of subscription change is sent to the application server by the communication device or by an entity of the second telecommunication network after user agreement.

4. The method according to claim 3, wherein the request of subscription change comprises an identifier of the smart card and an identifier of the second telecommunication network.

5. The method according to claim 1, wherein an application in the smart card checks if the admin code received in the first message is compatible with an admin code initially stored in the smart card to determine if the admin code is valid.

6. The method according to claim 1, wherein the messages are encrypted short messages.

7. The method according to claim 1, wherein the messages are decomposed in many messages.

8. The method according to claim 1, wherein the messages contain data packets sent to the smart card through a service node and a gateway node of the second telecommunication network via the secured session.

9. The method according to claim 1, wherein the communication device comprises a mobile phone, a Personal Digital Assistant (PDA), a smart phone, or an automatic counter of water, gas, or electricity belonging to a company in the energy sector.

10. The method according to claim 1, wherein the secure session is based on Internet Protocol security (IPsec).

11. The method according to claim 1, wherein the personalization server comprises a processing unit dedicated to computing authentication keys.

12. The method according to claim 1, wherein the first message comprises the personalization command, the admin code and an identifier of the personalization server.

13. A smart card coupled with a communication device of a user being a subscriber of a first telecommunication network, a first international identity and a first authentication key being stored in the smart card, the smart card being adapted to:
receive a first message from an application server connected to the first telecommunication network and a second telecommunication network, the first message comprising a personalization command and an admin code, the admin code being a unique code for accessing or modifying the smart card;
interpret the personalization command to establish a secure session with a personalization server of the second telecommunication network via the application server if the admin code is valid;
negotiate with the personalization server to agree on a second authentication key by exchanging messages based on a Diffie-Hellman protocol, wherein the messages contain values derived from random secrets, the second authentication key being computed in the smart card and in the personalization server based on a function that takes as input at least the random secrets;
receive a second message that contains a second international identity from the personalization server; and
replace the first international identity and the first authentication key with the second international identity and the second authentication key.

14. An application server for personalizing a smart card coupled with a communication device of a user being a subscriber of a first telecommunication network, a first international identity and a first authentication key being stored in the smart card, the application server being connected to the first telecommunication network and a second telecommunication network, the application server being adapted to:
receive a request of subscription change comprising an identifier of the second telecommunication network and an identifier of the smart card;
establish a secured session with a personalization server of the second telecommunication network identified by the identifier of the second telecommunication network; and
send a first message comprising a personalization command and an admin code in order that the smart card interprets the personalization command to establish a secure session with the personalization server via the application server if the admin code is valid, the admin code being a unique code for accessing or modifying the smart card;
negotiates with the personalization server to agree on a second authentication key by exchanging messages based on a Diffie-Hellman protocol, wherein the messages contain values derived from random secrets, the second authentication key being computed in the smart card and in the personalization server based on a function that takes as input at least the random secrets;
receives a second message that contains a second international identity from the personalization server; and
replaces the first international identity and the first authentication key with the second international identity and the second authentication key.

15. A personalization server for personalizing a smart card coupled with a communication device of a user being a subscriber of a first telecommunication network, a first international identity and a first authentication key being stored in the smart card, the personalization server being connected to a second telecommunication network, the personalization server being adapted to:
establish a secure session with the smart card via an application server connected to the first and second telecommunication networks if an admin code received in a first message sent from the application server to the smart card is valid, the admin code being a unique code for accessing or modifying the smart card;
negotiate with the smart card to agree on a second authentication key by exchanging messages based on a Diffie-Hellman protocol, wherein the messages contain values derived from random secrets, the second authentication key being computed in the smart card and in the personalization server based on a function that takes as input at least the random secrets; and
send a second message that contains a second international identity to the smart card that is able to replace the first international identity and the first authentication key with the second international identity and the second authentication key.

16. A non-transitory computer readable storage information medium readable by a data processing device having computer readable instructions encoded therein, said computer readable instructions adapted to be executed in an application server for personalizing a smart card coupled with a communication device of a user being a subscriber of a first telecommunication network, a first international identity and a first authentication key being stored in the smart card, the application server being connected to the first telecommunication network and the second telecommunication network, said computer readable instructions adapted to be executed to implement a method, comprising:

receiving a request of subscription change comprising an identifier of the second telecommunication network and an identifier of the smart card;

establishing a secured session with a personalization server of the second telecommunication network identified by the identifier of the second telecommunication network; and sending a first message comprising a personalization command and an admin code in order that the smart card interprets the personalization command to establish a secure session with the personalization server via the application server if the admin code is valid, the admin code being a unique code for accessing or modifying the smart card;

negotiates with the personalization server to agree on a second authentication key by exchanging messages based on a Diffie-Hellman protocol, wherein the messages contain values derived from random secrets, the second authentication key being computed in the smart card and in the personalization server based on a function that takes as input at least the random secrets;

receives a second message that contains a second international identity from the personalization server; and replaces the first international identity and the first authentication key with the second international identity and the second authentication key.

17. A non-transitory computer readable storage information medium readable by a data processing device adapted to be executed in a personalization server for personalizing a smart card coupled with a communication device of a user being a subscriber of a first telecommunication network, a first international identity and a first authentication key being stored in the smart card, the personalization server being connected to the second telecommunication network, said computer readable instructions adapted to be executed to implement a method, comprising:

establishing a secure session with the smart card via an application server connected to the first and second telecommunication networks if an admin code received in a first message sent from the application server to the smart card is valid, the admin code being a unique code for accessing or modifying the smart card;

negotiating with the smart card to agree on a second authentication key by exchanging messages based on a Diffie-Hellman protocol, wherein the messages contain values derived from random secrets, the second authentication key being computed in the smart card and in the personalization server based on a function that takes as input at least the random secrets; and sending a second message that contains a second international identity to the smart card that is able to replace the first international identity and the first authentication key with the second international identity and the second authentication key.

* * * * *